Oct. 23, 1951  P. R. MENZEL ET AL  2,572,646
APPARATUS FOR HIGH-FREQUENCY HEATING AND SEALING FIXTURES
Filed May 23, 1947  3 Sheets—Sheet 1
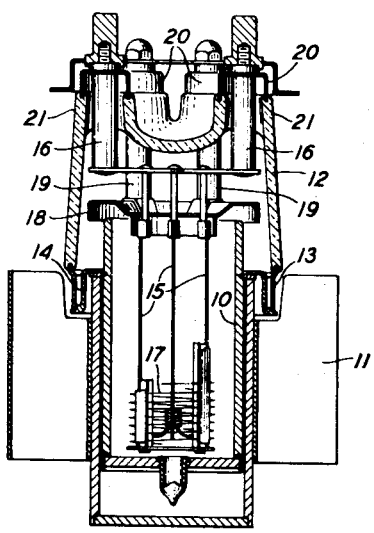
FIG. 1
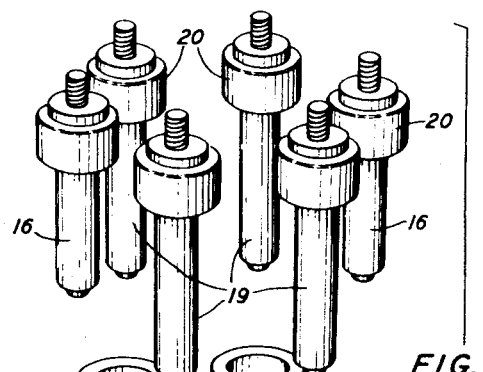
FIG. 2
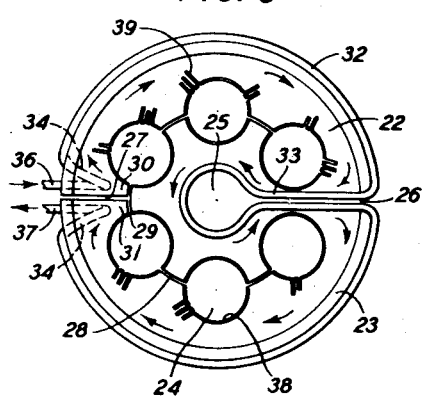
FIG. 3
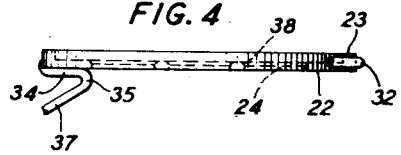
FIG. 4
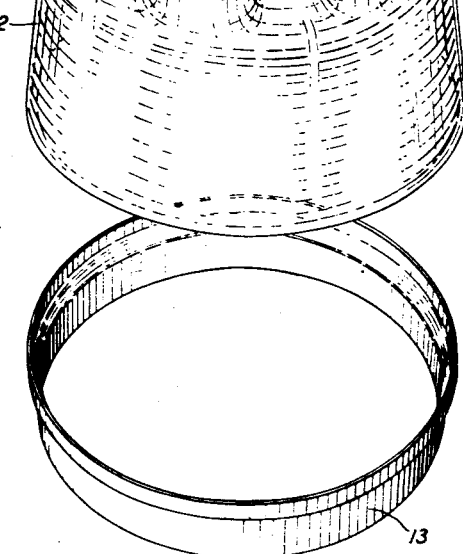
INVENTORS: P. R. MENZEL
J. W. WEST
BY
ATTORNEY

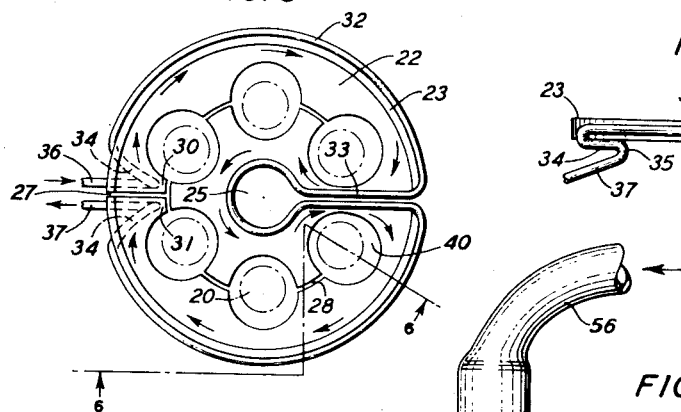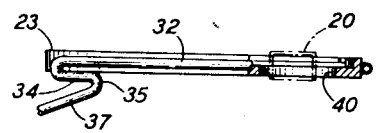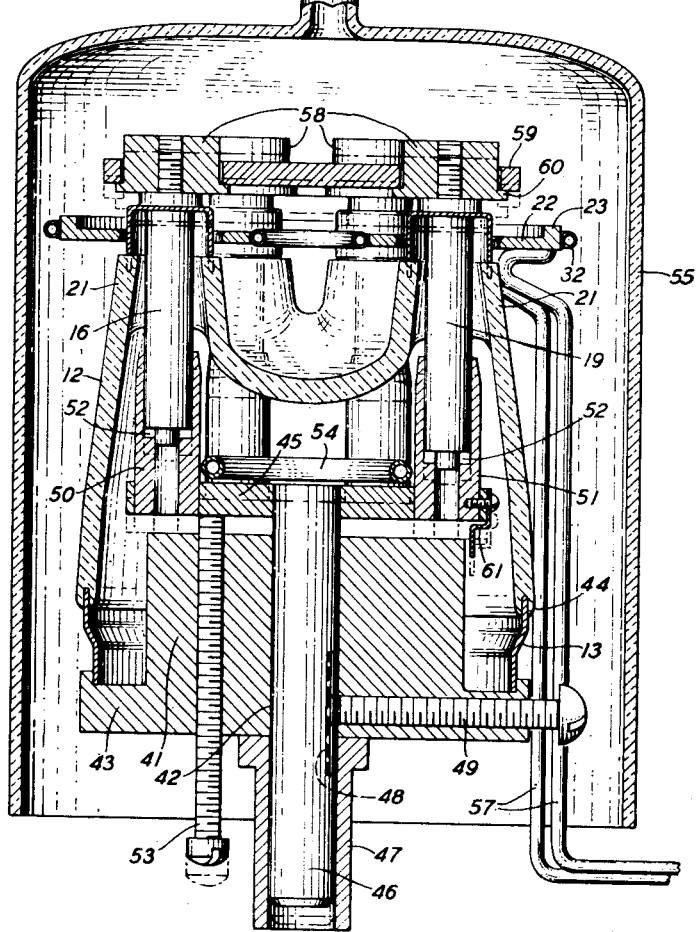

Oct. 23, 1951  P. R. MENZEL ET AL  2,572,646
APPARATUS FOR HIGH-FREQUENCY HEATING AND SEALING FIXTURES
Filed May 23, 1947  3 Sheets-Sheet 3
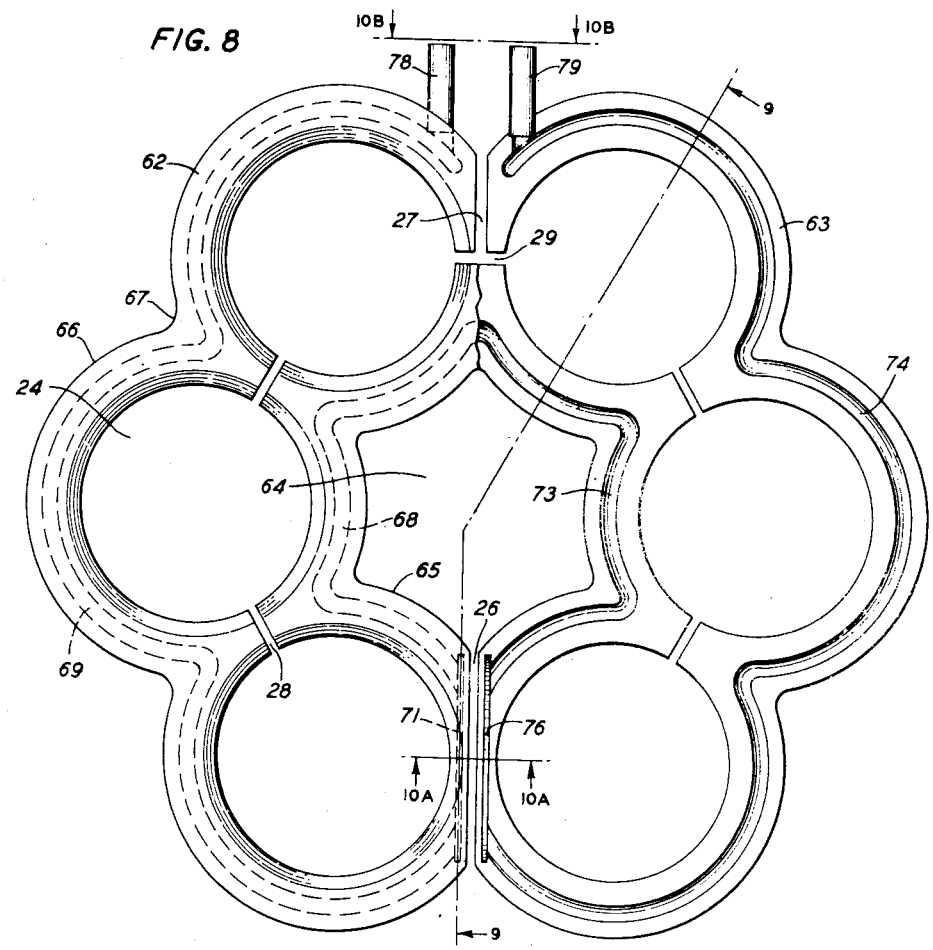
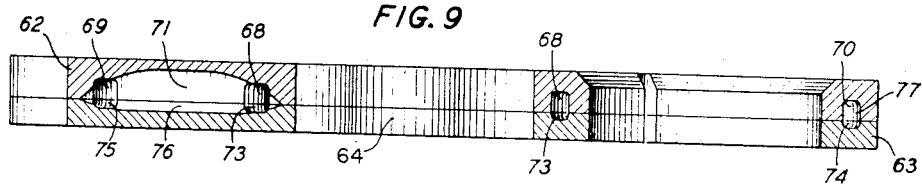
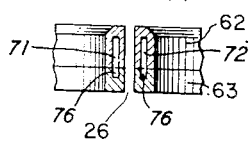 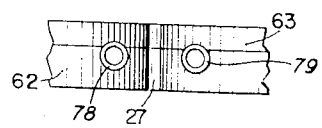
INVENTORS: P. R. MENZEL
J. W. WEST
BY
ATTORNEY

UNITED STATES PATENT OFFICE 2,572,646

APPARATUS FOR HIGH-FREQUENCY HEATING AND SEALING FIXTURES

Paul R. Menzel, Queens Village, and John W. West, Jackson Heights, N. Y., assignors to Bell Telephone Laboratories, Incorporated, New York, N. Y., a corporation of New York Application May 23, 1947, Serial No. 750,130

7 Claims. (Cl. 49—2)

This invention relates to glass to metal sealing apparatus and more particularly to high frequency induction heating equipment for multiple sealing of a plurality of metal terminals to a glass stem for electronic discharge devices.

One type of high power transmitting tube of the external anode type, either air or water-cooled, utilizes a glass portion or stem for segregating the internal electrodes from the anode. One arrangement involves a plurality of large area cap terminals sealed in the closed end of the stem, the terminals directly supporting the cathode and control electrode within the vessel in relation to the anode. When there are more than two or three terminals, for example, in split phase power supply connections for the filamentary cathode and multi-pedestal connections for the support of the control electrode assembly, the cap terminals ordinarily are disposed in a circular boundary in the stem. Since the large area cap terminals must be hermetically sealed to tubular extensions on the glass stem, the sealing of a large group of terminals in the stem has required special skill on the part of the glass worker and elaborate equipment, particularly in gas flame heating technique, for fusing the glass in sealing relation to the terminals.

An object of this invention is to overcome prior difficulties in the group sealing of metal components in a glass member.

Another object of the invention is to facilitate the sealing of metal and glass parts in an expeditious manner without special skill on the part of the operator.

A further object of the invention is to produce uniform and simultaneous fusion of the seals in multiterminal composite assemblies.

Another object is to insure symmetrical relation of the metal components with the respective glass parts of the stem or other vitreous element to which they are sealed.

Further objects of the invention are to increase production and eliminate costly and complicated sealing equipment.

Another object of the invention is to cause the fusion of the seals by high frequency induction heating in a single operation in which uniform heating effects prevail in the intimate sealing joints between the metal and glass parts.

These objects are attained, in accordance with features of this invention, in a multiterminal glass stem assembly involving a plurality of metallic cap terminals in juxtaposition to a plurality of tubular extensions on a stem in a circular boundary by surrounding the group of terminals with a heavy circular "pancake type" heating plate or single turn coil having spaced apertures in relation to the terminals in the positions in which they are mounted on the stem. The plate is provided with an axial opening which joins to a radial slot toward one edge to form a split coil between symmetrical apertures on one half with respect to similar apertures on the opposite half of the plate. The plate is also slotted intermediate adjacent apertures on a circular boundary except across the radial slot and the intermediate slot between two of the apertures opposite the radial slot is in communication with a perpendicular slot extending to the edge of the plate in linear diametrical relation to the main radial slot. High frequency current traversing the plate follows a circuitous path from the input, around the periphery on one half of the plate, around the central opening and the periphery on the opposite half of the plate to the output terminal. This path is defined by the disposition of the slots, both circular and diametrical, in the plate to control the flow of heating current in a predetermined manner to inductively energize the thin metal parts centered in the circular apertures in the plate.

A feature of the construction involves the provision of short slots on the outer boundary of the circular apertures to prevent localized heating effects on the terminals disposed in the apertures.

Another feature of the invention relates to the direction of the high frequency energy toward the restricted portions of the plate adjacent the input and output terminals of the current path in the plate. This is accomplished by forming sharp reverse bends in a tubular conductor parallel to the short radial slot in the plate, the sharp bends extending along the restricted portions of the plate to induce a preferential flow of current toward the restricted portions adjacent the transverse slot bisecting the radial slot.

A further feature of the invention is concerned with a modified form of high frequency heating element in which the openings surrounding the metallic terminals are asymmetrically shaped to uniformly control the heating effect of the terminals which are located therein in such a manner that the interior edge portions of the openings are closer to the terminals than the outer edge portions. This arrangement produces equalization of the heating effect by disposing the terminals in eccentric relation to the axes of the openings, to compensate for the greater mass of surface area of the plate adjacent the periphery compared to the lesser mass in the interior boundary of the plate surrounding the central opening.

Another feature of the invention relates to the conduction of heating current to the plate element to secure an equalized flow of heating energy in a definite path around the surface of the plate. A continuous tubular conductor surrounds the circumference of the plate and has an intermediate loop extending toward the center of the plate, the center and outer loops being concentric, with the coupling legs of the loops linearly disposed with respect to the terminal ends of the conductor in a line along the diametral slots of the plate. This arrangement efficiently distributes the heating energy in a predetermined path so that current is induced to flow in a circuitous course for equalizing the energy to all parts of the plate.

Another feature relates to a modified form of heating element having the conducting path formed integral with the disc and the inner and outer boundaries substantially conforming to the contours of the apertures in the disc element. This is accomplished by forming curvilinear furrows in bi-part disc members between the boundaries and the apertures and connecting them by parallel restricted recesses to form a continuous passageway integral with the disc layers for circulating a cooling fluid therethrough and conveying the high frequency current in close proximity to the multiple apertures in the heating element.

A further feature of the invention relates to apparatus for forming the multiple seals in the stem simultaneously in an efficient manner so that a minimum of technical skill is required to achieve consistent results in tight hermetic sealed joints between the metal-glass components involved in the assembly. This is accomplished by the use of a sealing fixture or mounting for the assembly of the stem and terminal components in concentric relation and sealing the terminals in the stem by high frequency heating with the aid of a coil of this invention in a non-oxidizing atmosphere. The fixture includes an index mounting base for the stem and a slidable platform centrally associated with the base for supporting the terminal elements. The terminals have a weight assembly superimposed thereon and the coil encompasses the terminals for heating the terminals by high frequency current and effecting the sealing operation to the stem simultaneously. As the glass becomes plastic in the vicinity of the edges of the terminals, means is provided to embed the edges of the terminals in the yielding glass to form the hermetic seals in a single operation.

These and other features and advantages of the invention will be apparent in the following detailed description when considered with the accompanying drawings in which:

Fig. 1 illustrates in cross-section one type of high power discharge device embodying a multi-terminal stem assembly illustrative of a type structure to which this invention is applicable;

Fig. 2 is an enlarged perspective view, in exploded fashion, of the multi-terminal stem shown in the device of Fig. 1;

Fig. 3 is a plan view of a heating element illustrative of this invention which may be utilized in sealing the multi-terminals in the glass stem assembly in a single operation;

Fig. 4 is a side view of the element of Fig. 3 showing the disposition of the current supply conductor in relation to the element;

Fig. 5 is a plan view of a modified form of the heating element showing the relationship of the apertures with respect to the terminals of the stem;

Fig. 6 is a side view of the element of Fig. 5;

Fig. 7 shows in cross-section a mounting assembly for simultaneously sealing the group of terminals in the glass stem, in accordance with the methods of this invention;

Fig. 8 is a plan view of a modified form of the heating element in which the boundaries of the disc follow the contour of the terminal apertures and in which the conducting path is formed integral with the disc;

Fig. 9 shows in cross-section the layer construction of the disc and the internal fluid circulating passageway formed in the disc taken on the line 9—9 of Fig. 8;

Fig. 10A is an enlarged cross-section view of the slot configuration, taken on the line 10A—10A of Fig. 8; and Fig. 10B is a partial end view of the terminations of the coil which join the ends of the circuitous duct within the disc element of this invention taken on the line 10B—10B of Fig. 8.

Referring to Fig. 1 of the drawings, one type of high power transmitting discharge device to which this invention pertains has an external anode 10 surrounded by a cooling fin assembly 11 and joined to a molded or pressed glass stem 12 by a metallic ring 13 brazed to a flange member 14. A multi-strand cathode or filament 15 is mounted on arms extending to a pair of terminal posts 16 and a helical grid or control electrode assembly 17 is attached to a disc shield 18 mounted on a plurality of posts 19. These posts are centered in metallic cap terminals 20 having the edges embedded in the ends of tubular extensions 21 of the stem to form hermetically sealed joints between the terminals and stem and to rigidly support the internal electrodes in uniform spaced relation. This construction is more clearly described and certain features thereof are claimed in application, Serial No. 703,432, filed October 15, 1946, by Victor L. Ronci and John W. West, now Patent No. 2,520,016, issued August 22, 1950.

The complicated stem and terminal assembly and the requirements of attaining accurate concentricity between the posts and tubular extensions and the cooperating edges of the extensions and cap terminals impose considerable manufacturing difficulties due to the multi-terminal arrangement and the necessity of securing efficient joints between the components in the limited area of the stem.

In accordance with features of this invention, the multi-sealing of the terminals to the circularly arranged tubular extensions on the glass stem is performed simultaneously and efficiently in a simple procedure which requires no great amount of technical skill on the part of the operator. This is accomplished by a high frequency induction heating technique employing a planar metallic element, such as shown in Figs. 3 and 4 which illustrate one form of the coil of this invention adapted for sealing the cap terminals 20 to the extensions 21 on the stem.

The heating element or flat plate is in the form of a "pancake" or disc 22, advantageously of heavy gauge copper, having a flanged rim 23 to increase the rigidity and prevent warping. Since the stem 12 is provided with six tubular extensions for the accommodation of a similar number of terminals in the application of the specific assembly of Fig. 1, the element 22 is also provided with equally spaced circular apertures 24 having the same centers as the tubular extensions 21 on the stem. These apertures are of larger diameter than the cap terminals 21 so that they uniformly encompass the terminals when placed in sealing position on the extensions, each terminal being concentric with the periphery of its respective cooperating aperture in the heating element.

In order to induce the heating current to flow in a circuitous path around all portions of the plate on the boundaries of the spaced apertures, the plate is provided with appropriate slots or restricted channels to substantially divide or split the plate element into two equal halves of semicircular configuration with the apertures 24 uniformly distributed on opposite sections of the plate. A central large diameter aperture, opening or axial hole 25 is formed in the plate and a wide radial slot 26 extends to one edge of the plate to form the main gap. A short restricted slot 27 extends from the opposite edge to terminate intermediate the middle pair of apertures in the plate, the slot 27 being aligned with respect to the main gap to form the split planar element. All of the apertures, exclusive of those on opposite sides of the main gap, are joined serially by arcuate slots 28 substantially midway between the periphery and the inner edge of the plate element, with the mid-slot 29 joined to the restricted diametral slot 27. This configuration provides a preferential path around all portions of the planar element to cause the heating energy to follow a path from the input segment 30, around the periphery in the direction of the arrows, as shown in Fig. 3, along one side of the slot 26, around the axial hole 25, along the opposite side of the slot 26, to the opposite periphery and then to the output segment 31. The arcuate slots 28 and 29, which are intermediate the periphery and the inner edge of the central opening, segregate the current flow into a circuitous and series conduction path which follows a compound reflex curve on each half of the disc with both halves being in symmetrical epi-cycloidal relation or kidney-shaped configuration. This arrangement concentrates the heating effect of the high frequency current supplied by the coil or plate element to the terminals in uniform multi-petal clover-leaf pattern to feed the energy as close as possible to all the surfaces of the terminals, whereby the terminals are simultaneously heated by induction to a sufficient fusing temperature to reduce the contact edges of the glass extension 21 to a plastic state for creating the hermetic sealed joints between the terminal caps and the stem. The shape of the planar disc may be modified by following the contours of the circular apertures so that the outer and inner boundaries of the disc are arcuate segments on opposite sides of each aperture.

The high frequency current is supplied to the planar element by a continuous metallic conductor 32, advantageously of hollow copper tubing, which is rigidly affixed to the outer surface of the flange 23, for example by soldering, and an intermediate loop portion 33 which follows the contour of the main gap 26 and central hole 25. The parallel leg portions in the main gap are insulated from each other by a restricted gap or slot equivalent to the oppositely disposed slot 27. The terminal ends of the conductor are bent inwardly, as at 34, and extend along the bottom surface of the disc with a sharp reverse bend or knee portion 35 along the segments 30 and 31 to bring the ends out parallel but at a downward angle to the slot 27. The input terminal 36 and the output terminal 37 arrangement of the conductor provides a continuous circuit over the whole area of the disc and concentrates the knee bent portions of the conductor at the restricted segmental portions 30 and 31 of the plate to overcome the tendency of the current to flow in a preferential path along the rim or edge of the disc. By projecting the current toward the restricted segments 30 and 31, these are heated to the same extent as the remainder of the disc and produce uniform induction current in the portions of the cylindrical terminals disposed in the apertures adjacent the restricted slot 27 in the disc. The tubular conductor 32 is cooled by a fluid, such as water, conveyed through it to dissipate heat in the thin wall of the conductor and, therefore, maintains its temperature low so as to prevent melting or puncture which might occur due to the high voltages employed in the system. The edges of the plate in the apertures 24 are beveled on the upper surface 38 to provide a smooth edge free from burrs which might cause corona discharge or arcing between the disc and terminals disposed in the apertures. If desired, the cooling conductor may be formed integral with the disc by forming grooves or slots in the solid portions of the disc to circulate the fluid and supply heating energy to all portions of the disc.

Since the terminals are disposed in a congested location in a circular boundary in the stem, the heating element or disc 22 is confined to a similar shape which necessarily increases the area of the disc around the outer boundary in proportion to the area of the disc on the inner boundary within the apertures. This might produce unequal heating since the greater mass of the disc in the outer boundary absorbs greater heating energy than the inner boundary. When this occurs, the outer portions of the terminals may be excessively heated in spots due to the greater energy fields supplied to the terminals at these portions. This may be overcome by distributed short saw slots 39 at the points on the outer boundaries of the apertures where the localized heating would occur. These slots diminish the hot-spot characteristic of the current and redistribute the energy fields so that the terminals are heated uniformly to effect the sealing junction with the glass stem.

Another embodiment of the invention is shown in Figs. 5 and 6 and is similar to the split disc heating element described in connection with Fig. 3. In this embodiment, the heating energy is equalized in the terminals 20 by forming the apertures surrounding the terminals as ovoids 40 with the axes of the terminals 20 offset from the axes of the apertures in a radial direction so that the inner surfaces of the apertures are close to the inner cylindrical surfaces of the terminals while the outer surfaces of the apertures are spaced at a greater distance from the outer cylindrical surfaces of the terminals. This arrangement produces uniform and efficient simultaneous heating of the terminals regardless of the disparity of the masses of the disc at the inner and outer portions of the disc. The larger spacing of the edges of the apertures from the outer boundaries of the terminals equalizes the energy fields supplied to the complete circumference of the terminals and creates uniform heating effects in the terminal walls so that detrimental spot-heating is avoided.

The procedure and sealing fixture for accomplishing the simultaneous sealing of the multi-terminals to the associate glass stem, in accordance with the single operation technique of this invention, is shown in Fig. 7. A circular metallic block or base 41 having a central bore 42 is provided with a flanged ledge 43 which forms an index surface for mounting the stem 12 in concentric position on the sealing fixture or jig. This ledge engages and centers the sealing ring 13 on the stem. The seal 44 may be made in a separate operation prior to mounting the stem in the fixture; alternatively, it may be desirable to produce this seal in the present fixture prior to performing the terminal sealing operation. This may be accomplished by surrounding the joint with a conventional high frequency coil, not shown, to effect the ring-stem seal 44. Assuming that the stem and ring are fabricated beforehand, the stem is then inverted on the mounting block 41 with the tubulations 21 projecting upwardly beyond the block. A circular platform 45 extends above the block within the stem and is coaxially mounted in slidable relation to the block by a column or sliding post 46 which extends through the bore 42 and a guide sleeve 47 affixed to the bottom of the block. The post is provided with a keyway slot 48 and is prevented from rotating by a locking screw member 49 extending through the block.

The platform 45 carries a plurality of metallic sleeves 50—51 which are disposed in a circular boundary on the platform and project toward the tubular extensions 21 of the stem with which they are coaxial to insure the proper centering of the terminal assemblies with respect to the extensions. The sleeves, shown in cross-section in Fig. 7, are merely illustrative to show the socket portions 52 for receiving the different lengths of the posts 16 and 19, respectively, of the terminal assembly. The illustration is not intended to be exact for the stem and terminal assembly of Fig. 2 since in this stem the short posts 16 are oppositely disposed in the stem. The platform sleeves, being in coaxial relation to the extensions 21 of the stem, will necessarily position the multi-terminal caps 20 os the edges of the extensions 21 when the posts 16 and 19 are inserted in the sleeves 50 and 51. The platform is held in an elevated position above the block 41 by a screw member 53. A water-cooled coil 54 is disposed on the platform 45 within the boundary of the sleeves to prevent warping or excessive expansion of the metal due to the heat conveyed to it through the posts in the sleeves.

When the terminal assemblies are mounted concentrically in relation to the extensions of the stem, the planar heating element 22, of either form of the invention heretofore described, is mounted coaxially in relation to the cap terminals 20, as shown in Fig. 7. Since the cap terminals are formed, preferably, of "Kovar" alloy to readily seal to the borosilicate glass stem which has substantially the same thermal coefficient characteristics, it is advantageous to perform the sealing operation in a non-oxidizing atmosphere. This is accomplished by surrounding the fixture and sealing components together with the coil in a glass bell jar 55 and supplying an inert gas, such as nitrogen, through a nozzle pipe 56 to flow the gas downwardly around the fixture. The gas escapes through the open bottom of the bell.

Since the coil 22 is situated close to the cap terminals, the ends of the high frequency conductor are lengthened at 57 to extend the conductor to the exterior of the bell in order to connect the conductor to a suitable high frequency induction source. A group of weights, in the form of cylindrical blocks 58, of copper or other heavy high conductivity metal, are secured to the threaded studs on the exterior of the cap terminals and these blocks are encompassed by a heat-resistant plate 59, of insulating material, for example of asbestos-cement composition such as "Transite," the plate resting on circular flange portions 60 of the blocks.

The simultaneous fusing of the cap terminals in the extensions of the stem by an unskilled operator is readily attained, in accordance with the sealing technique and coil configuration of this invention. This is accomplished, in the arrangement of Fig. 7, by supplying the high frequency energy to the planar element 22 which surrounds the metallic cap terminals 20. The fields produced in the circuitous path of the element induce heating current in the thin-walled caps 20 which are uniformly heated to a high temperature. The heating energy is conducted to the glass extensions so that the glass material is likewise heated to a plastic state. When the caps are sufficiently energized to produce the heating temperature in the glass, locking screws 49 and 53 are released and the pressure of the weights 58 causes the edges of the caps to be embedded in the plastic glass of the extensions. The degree of embedding may be determined by an indicator 61 secured to the platform which cooperates with a suitable scale on the block, to aid in the visual control of the multi-terminal seals on the stem. The indicator, as shown, may be a thin piece of metal which has a pointed end adjacent the block, the point being readable on the cooperating scale to measure the embedding. When the seals are completed, each terminal has its edge embedded in the glass of the respective extension, as shown in dotted lines in Fig. 7, and forms a hermetic joint, similar to the seal shown at 44. After the sealing operation is completed, the stem and terminal assembly is removed from the fixture as an integral unit in which the cap terminals are coaxial with the edges of the glass extensions and the terminal posts within the stem are concentric with the extensions.

The construction of another embodiment of the invention involving a contour of the disc element which substantially conforms to the boundaries of the terminal apertures and is provided with an integrally formed circuitous duct or passageway for the circulation of the cooling fluid and the control of the flow of high frequency energy is disclosed in Fig. 8. In this embodiment of the invention, the disc element is fabricated in two layers or bi-part disc members 62 and 63. The central opening 64 is provided with equal sextuple curved sides 65 to conform to the inner boundaries of the six circular apertures 24 with the points of the sides being in line with the slots 28 connecting adjacent apertures. Similarly, the outer periphery of the members is curved at 66 so that the edge of the disc is substantially equidistant from the outer boundaries of the apertures 24 with the points 67 in opposed relation across the slots 28 to the points of the inner configured opening 64.

A curvilinear deep groove or furrow 68 is milled in the rear surface of the member 62 and follows the contour of the sides 65 of the central opening, the groove being disposed intermediate the edges of the inner boundaries of the circular apertures 24 and the central opening 64. The groove 68 is interrupted on opposite sides of the dividing slot 26, as shown in Fig. 8, so that the groove forms an incomplete loop around the inner boundary of the apertures. Within the outer boundary of the disc 62 a pair of similar grooves or furrows 69 and 70 are formed beginning on opposite sides of the short slot 27 and continuing in arcuate series relation adjacent opposite sides of the main slot or gap 26. The inner incomplete groove 68 is joined intermediate the outer grooves 69 and 70 by parallel restricted deep slots or channels 71 and 72 respectively. This arrangement forms a continuous circuitous path around all the apertures 24 on the outer and inner peripheries. Similar curvilinear grooves 73, 74 and 75 are formed in the inner surface of the member 63 but of shallower depth and these grooves are connected by parallel channels 76 so that when both parts are brazed together a continuous duct or passageway 77 is integrally formed in the disc element for circulating a cooling fluid therein and conveying high frequency heating current to all positions of the disc in close proximity to the edges of the disc surrounding the apertures 24. The current and fluid are supplied to the internal duct by pipe connections 78 and 79 extending through the side walls of the disc on opposite sides of the slot 27, to form inlet and outlet terminals for the coil. The curvilinear flow of the current along the hexagonal shaped path on the inner boundary of the coil forces the current to uniformly heat the inner portions adjacent the gaps 28 so that all surfaces of the cup terminals 20 within the apertures are heated to the required sealing temperature simultaneously and peripheral slotting of the apertures is avoided.

While the invention has been disclosed with respect to certain forms of the disc coil in relation to a specific multi-terminal metal-to-glass seal of a stem, it is, of course, understood that various modifications may be made in the detailed assembly to effect the same type of simultaneous sealing of any number of terminals to a glass member, and such modifications are intended to be within the scope of this invention as defined in the appended claims.

What is claimed is:

1. A high frequency induction heating element comprising a metallic disc having an axial hole and a wide radial slot extending to the edge thereof, a short slot diametrically extending from the opposite edge of said disc, a plurality of equally spaced openings in said disc disposed in a circular boundary equidistant between the periphery and the axis of said disc and arcuate slots intermediate said spaced openings except intermediate the spaced openings on either side of said wide slot, the middle arcuate slot intersecting said short slot, and a continuous conductor attached to said disc along the periphery, said wide slot and said axial hole, whereby high frequency currents induced in said disc are constrained to follow a continuous double circuitous path along the outer and inner boundaries of said disc.

2. A high frequency induction heating element comprising a metallic disc member having a central opening and a slot extending between said opening and the periphery of said member, said member having also a plurality of similar shaped apertures disposed in a circular boundary between said central opening and the periphery of said member, a plurality of segmental slots interconnecting said apertures on a circular boundary coaxial with the edge of said member and another slot substantially dividing said disc into similar portions with said apertures uniformly spaced on separate halves of said disc member, and a rigid metallic conductor affixed to said member in a circuitous path following the outer and inner boundaries of said member, the terminal ends of said conductor having reverse bend portions parallel to said last slot extending to the edge of said member.

3. A high frequency induction heating element comprising a metallic disc member having a central opening and a slot extending between said opening and the periphery of said member, said member having also a plurality of similar shaped apertures disposed in a circular boundary between said central opening and the periphery of said member, a plurality of segmental slots interconnecting said apertures on a circular boundary coaxial with the edge of said member and another slot in said member substantially dividing said disc into similar portions, and a rigid metallic conductor affixed to said member in a circuitous path following the outer and inner boundaries of said member, the terminal ends of said conductor having reverse bend portions parallel to said last slot, said bend portions being disposed on one side of said disc.

4. A high frequency induction heating element comprising a heavy copper disc having a flanged rim, said disc having a central circular opening therein communicating with a diametral slot extending to one edge of said disc, a short slot extending from the opposite edge to substantially split said disc into equal half portions interconnected by a solid area between said short slot and said central opening, ovoid-shaped apertures disposed in arcuate spaced relation on each half portion, interconnecting arcuate slots joining adjacent apertures to the center aperture of each group, and a conjoint arcuate slot connecting said groups of apertures and intersecting the end of said short radial slot, and a tubular copper conductor encompassing said rim with an inner loop following the contour of said central opening and connecting slot, said conductor having knee portions extending parallel to said short radial slot and projecting toward said intersecting arcuate slot to distribute the high frequency fields in a circuitous course around said apertures in sequential order between the input and output terminals of said conductor.

5. A sealing fixture comprising, a circular metallic block having a flanged edge and a central bore, a platform beyond said block having a standard slidably mounted in said bore, a plurality of tubular sleeves projecting from said platform in a circular boundary, and means for controlling the position of said platform and standard with respect to said block.

6. A sealing fixture comprising, a circular metallic block having an upturned edge and a central bore, said block being adapted to support an inverted glass cup stem in coaxial relation by contact with said upturned edge, said stem having a plurality of tubular extensions in its closed end, a platform extending above said block, a central post having a key slot supporting said platform in said bore, an adjustable locking member extending through said block and engaging said slot, an adjustable locating member extending through said block for spacing said platform in relation to said block, and a plurality of tubular supports in circular spaced relation extending vertically from said platform and adapted for mounting a plurality of cap terminals in relation to the tubular extensions on said stem.

7. A sealing fixture comprising, a circular metallic block having an upturned edge and a central bore, said block being adapted to support an inverted glass cup stem in coaxial relation by contact with said upturned edge, said stem having a plurality of tubular extensions in its closed end, a platform extending above said block, a central post having a key slot supporting said platform in said bore, a plurality of metallic tubular supports on said platform equal to the number of tubular extensions on said stem, means for maintaining said supports coaxially with respect to the axes of said tubular extensions on said stem, an indicator on said platform in registry with said block, and a cooling coil on said platform within the boundary of said supports.

PAUL R. MENZEL.
JOHN W. WEST.

REFERENCES CITED

The following references are of record in the file of this patent:

UNITED STATES PATENTS

| Number | Name | Date |
|---|---|---|
| 2,048,556 | McArthur | July 21, 1936 |
| 2,125,316 | Ronci | Aug. 2, 1938 |
| 2,314,865 | Bierwirth | Mar. 30, 1943 |
| 2,353,130 | Dravneek | July 11, 1944 |
| 2,386,820 | Spencer | Oct. 16, 1945 |
| 2,402,508 | Strickland | June 18, 1946 |
| 2,408,229 | Roberds | Sept. 24, 1946 |
| 2,428,705 | Finger | Oct. 7, 1947 |
| 2,442,968 | Bierwirth | June 8, 1948 |
| 2,456,091 | Stevens et al. | Dec. 14, 1948 |

FOREIGN PATENTS

| Number | Country | Date |
|---|---|---|
| 502,551 | Great Britain | June 15, 1937 |